R. HUMPHRIES.
TRACTOR DRIVE.
APPLICATION FILED JUNE 12, 1918.
1,292,471.
Patented Jan. 28, 1919.
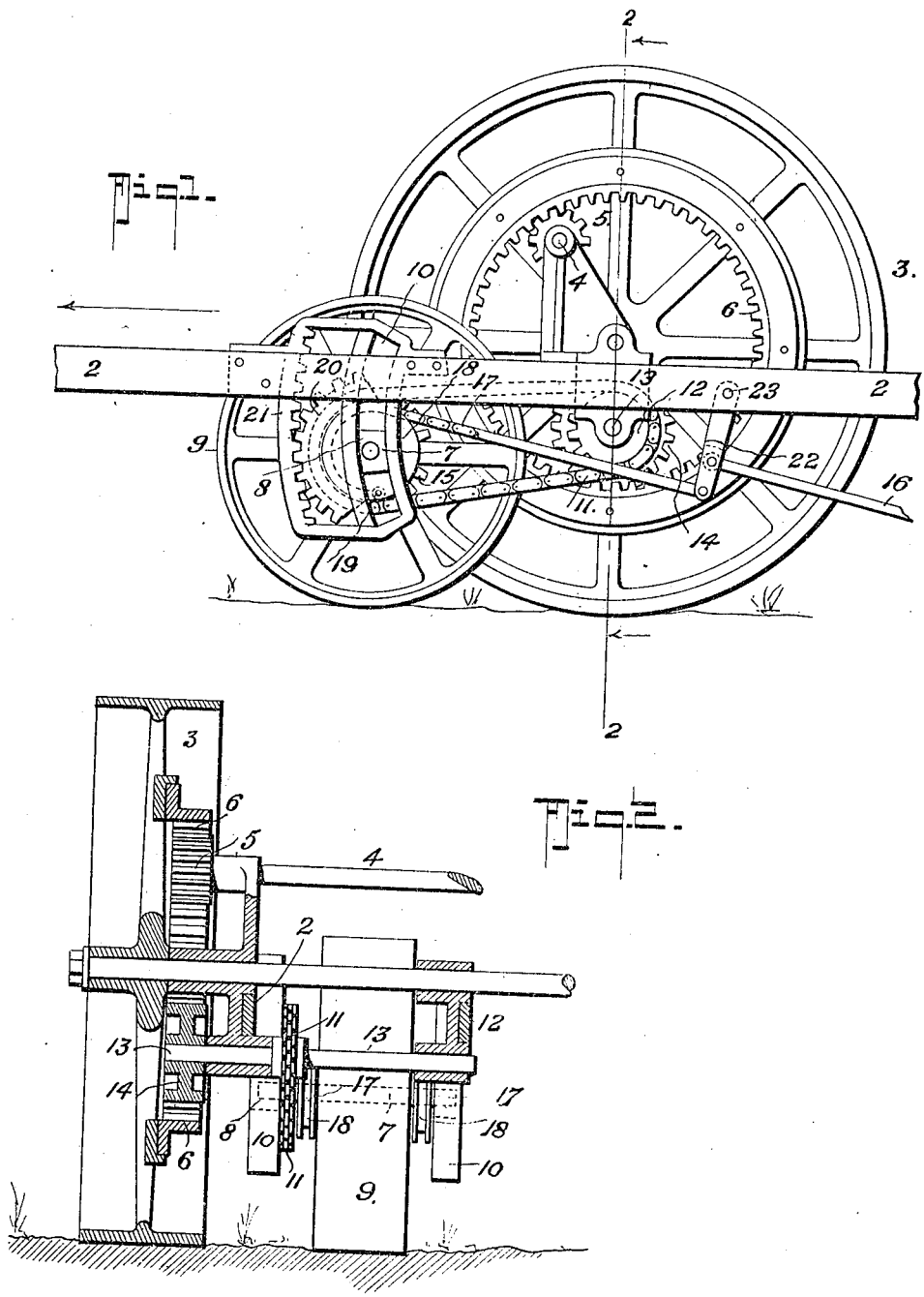
INVENTOR
Ralph Humphries
BY
Fred G. Dieterich & Co.
ATTORNEYS

UNITED STATES PATENT OFFICE.

RALPH HUMPHRIES, OF VANCOUVER, BRITISH COLUMBIA, CANADA.

TRACTOR-DRIVE.

1,292,471.

Specification of Letters Patent.   Patented Jan. 28, 1919.

Application filed June 12, 1918.   Serial No. 239,621.

*To all whom it may concern:*

Be it known that I, RALPH HUMPHRIES, a citizen of the Dominion of Canada, residing at Vancouver, in the Province of British Columbia, Canada, have invented certain new and useful Improvements in Tractor-Drives, of which the following is a specification.

This invention relates to an improvement in the arrangement and mechanism of the driving wheels of a tractor by which an enlarged area of driving wheel contact with the ground is attained and that without imposing excessive friction on the driving mechanism and without materially interfering with the turning power of the vehicle.

Further, the pressure of the driving contact on the ground is increased proportionately with the traction imposed on the engine.

These results are attained by the mechanism set forth in the following specification, reference being made to the drawings by which it is accompanied, in which:

Figure 1 is a side elevation of the driving wheels of one side of the vehicle from the inner side, and Fig. 2, a section on the line 2—2 in Fig. 1.

In these drawings 2 represents the frame of one side of the vehicle and 3 the main driving wheel of the same side. This wheel 3 is driven from the differential shaft 4 of the engine by a pinion 5, the teeth of which mesh with those of an internal gear 6 secured to the wheel 3.

A supplementary driving wheel 9 is mounted in front of the main driving wheel in bearing blocks 8 which travel in vertically disposed curved slots in frames 10 which are strongly secured to the inner adjacent sides of the frames 2. That the ground contacts of the wheels 3 and 9 may be brought as close together as practicable, the wheels are in different but parallel planes that their rims may overlap one another.

The supplementary wheel 9 is driven from the main driving wheel 3 by a chain 11 passing around a sprocket wheel 15 secured on the axle 7 of the supplementary driving wheel and one 12 secured on a short shaft 13 which is rotatably mounted in bearings secured to the frame 2 immediately below the axle of the main driving wheel, and is driven from that wheel by a pinion 14 secured on the shaft 13, the teeth of which pinion mesh with those of the internal gear 6 of the wheel.

The curve of the slot in which the bearings of the supplementary wheel axle rise and fall is struck from the center of the shaft 13 from which the wheel is driven that rise and fall of the supplementary wheel axle will not interfere with its chain drive.

The driving gear from the main driving wheel 3 to the supplementary driving wheel 9, which is of relatively less diameter, is so proportioned as to give substantially the same speed at the circumference of the two wheels.

With this supplementary drive wheel 9 the tractor has an increased ground contact for tractive purposes without materially extending the driving wheel base, so that the vehicle can turn on a comparatively small radius.

In order that the supplementary driving wheel 9 may be drawn more tightly into contact with the ground when a greater tractive effort is required, the draw bar 16 is flexibly connected by chains 17 which pass around sheaves 18 and are connected to them at 19. These sheaves 18 are free to rotate on the shaft 7 of the supplementary driving wheel and to each sheave is connected a geared sector 20, the teeth of which mesh with those of a geared segment 21 secured to and downwardly projecting from the frame 2 of the vehicle. These segments 20 may conveniently form a part of the frames 10 in which are the curved slots, as affording mutual support.

The draw bar 16 is preferably connected to a forked lever 22 mounted at 23 between the frames 2, and the flexible connections 17 of the two sheaves 18 are connected to bifurcated ends of this lever 22.

With this arrangement the supplementary driving wheel is directly drawn into contact with the ground by the pull of the draw bar and the fact that the tread of the supplementary wheel is on a different track to that of the main driving wheel will afford a better driving contact with the ground and be less liable to sink in soft ground. Further, the tread of the two wheels being as close as practicable together will facilitate turning of the vehicle.

I do not desire to be confined to the exact construction here set forth of increasing the pressure on the supplementary driving wheel by the pull of the draw bar where the wheels are in direct contact with the ground, as the same may be varied within wide limits, but consider my invention to reside in any means whereby the pull of the draw bar will increase the pressure on a supplementary driving wheel in direct contact with the ground, whether said wheel is mounted in advance of or behind the main driving wheel and whether it is drawn down by the curved rack and pinion or otherwise.

Having now particularly described my invention, I hereby declare that what I claim as new and desire to be protected in by Letters Patent, is:

1. In a tractor drive, the combination with a main driving wheel in direct contact with the ground, a supplementary driving wheel in similar direct contact with the ground but having provision whereby it may rise and fall in relation to the main driving wheel, and means operable by the pull of the draw bar for pressing the supplementary driving wheel into tighter contact with the ground as the pull on the draw bar is increased.

2. A tractor drive, comprising the combination with a main driving wheel in direct contact with the ground, a supplementary wheel in similar direct contact, which supplementary wheel is driven from the main driving wheel, the supplementary wheel having provision whereby it may rise and fall in relation to the main driving wheel while retaining its driving relation therewith, and means operative by the pull of the draw bar for pressing the supplementary wheel into closer contact with the ground as the pull on the draw bar increases.

3. A tractor drive, comprising the combination with a main driving wheel in direct contact with the ground, a supplementary wheel in similar direct contact and driven from the main driving wheel, the axles of the wheels being as close as practicable together in parallel but different planes of rotation, the supplementary wheel having provision whereby it may rise and fall in relation to the main driving wheel, and means operative by the pull of the draw bar for pressing the supplementary wheel into closer contact with the ground as the pull on the draw bar increases.

4. A tractor drive, comprising the combination with a main driving wheel in direct contact with the ground, a supplementary driving wheel in similar direct contact, which supplementary wheel is driven from the main driving wheel, the supplementary wheel having provision whereby it may rise and fall in relation to the main driving wheel while retaining its driving relation therewith, and means operative by the pull of the draw bar for pressing the supplementary wheel into closer contact with the ground as the pull on the draw bar increases, said means comprising a geared sector rotatably mounted on the axle of the supplementary wheel, the teeth of which sector mesh with those of a segment secured to the frame of the vehicle, and means for connecting the draw bar to the toothed sector whereby the tension of the draw bar rotates the sector to move it down the segment.

In testimony whereof I affix my signature.

RALPH HUMPHRIES.

Copies of this patent may be obtained for five cents each, by addressing the "Commissioner of Patents, Washington, D. C."